United States Patent
Tkachenko et al.

(10) Patent No.: US 11,362,535 B2
(45) Date of Patent: Jun. 14, 2022

(54) BATTERY CHARGING WITH CHARGING PARAMETERS SWEEP

(71) Applicant: GBatteries Energy Canada Inc., Ottawa (CA)

(72) Inventors: Oleksandr Tkachenko, Ottawa (CA); Mykola Sherstyuk, Ottawa (CA)

(73) Assignee: Gbatteries Energy Canada Inc., Ottawa (CA)

( * ) Notice: Subject to any disclaimer, the term of this patent is extended or adjusted under 35 U.S.C. 154(b) by 106 days.

(21) Appl. No.: 17/029,544

(22) Filed: Sep. 23, 2020

(65) Prior Publication Data
US 2021/0006086 A1 Jan. 7, 2021

Related U.S. Application Data

(63) Continuation of application No. 16/190,236, filed on Nov. 14, 2018, now Pat. No. 10,840,725, which is a continuation-in-part of application No. 15/644,498, filed on Jul. 7, 2017, now Pat. No. 10,135,281.

(60) Provisional application No. 62/360,432, filed on Jul. 10, 2016.

(51) Int. Cl.
*H02J 7/00* (2006.01)
(52) U.S. Cl.
CPC ............ *H02J 7/008* (2013.01); *H02J 7/0021* (2013.01); *H02J 7/0047* (2013.01); *H02J 7/00711* (2020.01); *H02J 7/00712* (2020.01)
(58) Field of Classification Search
CPC .... H02J 7/008; H02J 7/00711; H02J 7/00712; H02J 7/0021; H02J 7/0047

USPC ......................................................... 320/145
See application file for complete search history.

(56) References Cited

U.S. PATENT DOCUMENTS

| | | |
|---|---|---|
| 2,317,590 A | 4/1943 | Compere |
| 3,987,353 A | 10/1976 | Macharg |
| 4,016,473 A | 4/1977 | Newman |
| 4,680,241 A | 7/1987 | Dyer |
| 4,878,007 A | 10/1989 | Gabor et al. |
| 5,183,404 A | 2/1993 | Aldous et al. |
| 5,190,466 A | 3/1993 | McVey |
| 5,296,797 A | 3/1994 | Bartlett |
| 5,357,177 A | 10/1994 | Fey et al. |
| 5,411,405 A | 5/1995 | McDaniels et al. |

(Continued)

FOREIGN PATENT DOCUMENTS

| | | |
|---|---|---|
| CN | 201532995 U | 7/2010 |
| CN | 201804941 U | 4/2011 |

(Continued)

OTHER PUBLICATIONS

Alzieu, J., et al., "Improvement of intelligent battery controller: state-of-charge indicator and associated functions," J Power Source, vol. 67, No. 1-2, pp. 157-161 (1997).

(Continued)

*Primary Examiner* — Nathaniel R Pelton

(57) ABSTRACT

Methods, systems, and computer-readable media may charge a battery. A value of at least one battery parameter is determined, and a range of values to which the value of the at least one battery parameter corresponds to is identified. Based on the identified range of values, a set of values for at least one charging parameter is determined, and a battery is charged while a value of the at least one charging parameter is swept among the set of values.

20 Claims, 12 Drawing Sheets

(56) References Cited

U.S. PATENT DOCUMENTS

| | | |
|---|---|---|
| 5,436,548 A | 7/1995 | Thomas |
| 5,500,583 A | 3/1996 | Buckley et al. |
| 5,504,415 A | 4/1996 | Podrazhansky et al. |
| 5,525,892 A | 6/1996 | Phommarath |
| 5,547,401 A | 8/1996 | Aldous et al. |
| 5,648,714 A | 7/1997 | Eryou et al. |
| 5,677,612 A | 10/1997 | Campagnuolo et al. |
| 5,701,068 A | 12/1997 | Baer et al. |
| 5,734,205 A | 3/1998 | Okamura et al. |
| 5,747,189 A | 5/1998 | Perkins |
| 5,828,201 A | 10/1998 | Hoffman, Jr. et al. |
| 5,931,704 A | 8/1999 | Johnson et al. |
| 5,955,869 A | 9/1999 | Rathmann |
| 5,989,042 A | 11/1999 | Johnson et al. |
| 6,002,240 A | 12/1999 | McMahan et al. |
| 6,033,240 A | 3/2000 | Goff |
| 6,078,166 A | 6/2000 | Taricco |
| 6,132,327 A | 10/2000 | Campagnolo |
| 6,146,210 A | 11/2000 | Cha et al. |
| 6,150,795 A | 11/2000 | Kutkut et al. |
| 6,184,660 B1 | 2/2001 | Hatular |
| 6,232,750 B1 | 5/2001 | Podrazhansky et al. |
| 6,361,357 B1 | 3/2002 | Stillwell et al. |
| 6,364,697 B1 | 4/2002 | Tseng et al. |
| 6,366,056 B1 | 4/2002 | Podrazhansky et al. |
| 6,452,363 B1 | 9/2002 | Jabaji |
| 6,482,019 B1 | 11/2002 | Lo Forte et al. |
| 6,509,876 B1 | 1/2003 | Jones et al. |
| 6,561,824 B1 | 5/2003 | Beckham et al. |
| 6,707,272 B1 | 3/2004 | Thandiwe |
| 6,729,897 B2 | 5/2004 | Lai |
| 6,799,981 B1 | 10/2004 | Yu |
| 6,841,974 B2 | 1/2005 | Dykeman |
| 6,917,283 B2 | 7/2005 | Takeda |
| 7,189,089 B1 | 3/2007 | Liao |
| 7,364,473 B2 | 4/2008 | Ohta |
| 7,500,867 B1 | 3/2009 | Doglio et al. |
| 7,570,015 B2 | 8/2009 | Bansal et al. |
| 7,622,898 B2 | 11/2009 | Shimizu et al. |
| 7,630,810 B2 | 12/2009 | Guderzo |
| 7,794,263 B1 | 9/2010 | Kim et al. |
| 7,918,686 B1 | 4/2011 | Lin |
| 8,137,116 B2 | 3/2012 | Omori et al. |
| 8,138,724 B2 | 3/2012 | Li et al. |
| 8,142,221 B2 | 3/2012 | Malstrom et al. |
| 8,330,419 B2 | 12/2012 | Kim et al. |
| 8,368,357 B2 | 2/2013 | Ghantous et al. |
| 8,421,106 B2 | 4/2013 | Hwang |
| 8,427,106 B2 | 4/2013 | Kim et al. |
| 8,462,944 B2 | 6/2013 | Vanstone et al. |
| 8,513,921 B2 | 8/2013 | Berkowitz et al. |
| 8,698,022 B2 | 4/2014 | Kawakami |
| D718,241 S | 11/2014 | Gretz |
| 8,994,331 B2 | 3/2015 | Kerfoot, Jr. et al. |
| 9,054,440 B2 | 6/2015 | Taylor et al. |
| D734,271 S | 7/2015 | Tosto et al. |
| 9,966,780 B2 | 5/2018 | Sherstyuk et al. |
| D821,980 S | 7/2018 | Cousineau et al. |
| 10,020,608 B2 | 7/2018 | Cousineau et al. |
| 10,069,313 B2 | 9/2018 | Tkachenko et al. |
| 10,084,331 B2 | 9/2018 | Sherstyuk et al. |
| 2002/0028604 A1 | 3/2002 | Lo et al. |
| 2003/0224637 A1 | 12/2003 | Ling |
| 2004/0005947 A1 | 1/2004 | Shahana et al. |
| 2004/0038087 A1 | 2/2004 | Shiue et al. |
| 2004/0146764 A1 | 7/2004 | Tsai et al. |
| 2004/0224539 A1 | 11/2004 | Boyd et al. |
| 2006/0092583 A1 | 5/2006 | Alahmad et al. |
| 2006/0139020 A1 | 6/2006 | Wood et al. |
| 2007/0273643 A1 | 11/2007 | Erez et al. |
| 2008/0079397 A1 | 4/2008 | Fee et al. |
| 2008/0231228 A1* | 9/2008 | Fowler .................. H02J 7/0042 320/107 |
| 2010/0164430 A1 | 7/2010 | Lu et al. |
| 2011/0076525 A1 | 3/2011 | Zhang et al. |
| 2011/0198103 A1 | 8/2011 | Suzuki |
| 2011/0291619 A1 | 12/2011 | Asakura |
| 2012/0025756 A1 | 2/2012 | Xu et al. |
| 2013/0181667 A1* | 7/2013 | Takeshita ............. H04B 5/0075 320/108 |
| 2013/0234667 A1 | 9/2013 | Norton |
| 2013/0300370 A1 | 11/2013 | Hotta |
| 2014/0021959 A1* | 1/2014 | Maluf .................. H01M 10/44 324/426 |
| 2014/0340044 A1 | 11/2014 | Kim et al. |
| 2016/0014966 A1 | 1/2016 | Kraus et al. |
| 2016/0079788 A1 | 3/2016 | Amasaki et al. |
| 2018/0013306 A1 | 1/2018 | Tkachenko et al. |
| 2018/0191176 A1 | 7/2018 | Sherstyuk et al. |
| 2018/0226826 A1 | 8/2018 | Sherstyuk et al. |

FOREIGN PATENT DOCUMENTS

| | | |
|---|---|---|
| EP | 0 762 593 A2 | 3/1997 |
| EP | 2 894 706 A2 | 7/2015 |
| JP | H06163081 A | 6/1994 |
| KR | 10-2004-0080907 A | 9/2004 |
| SU | 922923 A1 | 4/1982 |
| WO | 98/52270 A | 11/1998 |
| WO | 2011/132300 A1 | 10/2011 |
| WO | 2013/142964 A1 | 10/2013 |
| WO | 2018/010019 A1 | 1/2018 |
| WO | 2018/126319 A1 | 7/2018 |

OTHER PUBLICATIONS

Chiasserini, C.F., and Rao, R.R., "A Model for Battery Pulsed Discharge with Recovery Effect," Wireless Communications and Networking Conference WCNC. 1999 IEEE, vol. 2, pp. 636-639 (1999).

Chiasserini, C. F., et al., "Pulsed Battery Discharge in Communication Devices," MobiCom '99 Proceedings of the 5th annual ACM/IEEE international conference on Mobile computing and networking, pp. 88-95 (1999).

Chiasserini, C. F., and Rao, R.R., "Pulsed battery discharge in communication devices," Proc. of Mobicom'99, Seattle, pp. 88-98 (Aug. 1999).

Fuller, T.F., et al., "Relaxation phenomena in lithium-Ion-insertion cells," J. Electrochem. Soc., vol. 141, No. 4, pp. 982-990 (1994).

Gomadam, P.M. et al., "Analysis of Pulse Discharge of a Lithium-Ion Battery," Center for Electrochemical Engineering, University of South Carolina, accessed at https://www.electrochem.org/dl/ma/200/pdfs/0148.pdf, p. 1 (Aug. 2014).

Lafollette, R. M., "Design and performance of high specific power, pulsed discharge, bipolar lead acid batteries," Proceedings of the Tenth Annual Battery Conference on Applications and Advances, pp. 43-47 (1995).

Lafollette, R. M. et al., "Design fundamentals of high power density, pulsed discharge, lead-acid batteries. II Modeling," in Journal of The Electrochemical Society, vol. 137, No. 12, pp. 3701-3707 (1990).

Li, J., et al., "The effects of pulse charging on cycling characteristics of commercial lithium-ion batteries," Journal of Power Sources, vol. 102, School of Chemical Engineering, Georgia Institute of Technology, pp. 302-309 (2001).

Nelson, R.F., et al., "Ultrafast pulse discharge and recharge capabilities of thin-metal film battery technology," 12th Annual Battery Conference on Applications and Advances, Long Beach, pp. 636-641 (Jan. 1997).

Nelson, B., "TMF ultra-high rate discharge performance," 12th Annual Battery Conference on Applications and Advances, Long Beach, pp. 139-143 (Jan. 1997).

Mino, R., and Hara, S., "A Pulsed Discharge Control of Battery," Tencon 2006. 2006 IEEE Region 10 Conference, Graduate School of Engineering, Osaka University, pp. 1-4 (2006).

Extended European Search Report dated Nov. 20, 2015 as received in Application No. 15151183.9.

(56) References Cited

OTHER PUBLICATIONS

International Search Report and Written Opinion of the International Searching Authority for PCT Application No. PCT/CA2013/000277 dated Jun. 13, 2013.
International Search Report and Written Opinion of the International Searching Authority for PCT Application No. PCT/CA2017/050833 dated Sep. 29, 2017.
International Search Report and Written Opinion of the International Searching Authority for PCT Application No. PCT/CA2018/050006 dated Apr. 4, 2018.

* cited by examiner

FIG. 12

Table I

| Index | I | II | III | IV | V | VI | VII | VIII | IX | X |
|---|---|---|---|---|---|---|---|---|---|---|
| Start voltage(OCV) | 2501 mV | 3001 mV | 3351 mV | 3451 mV | 3651 mV | 3751 mV | 3851 mV | 3999 mV | 4111 mV | 4151 mV |
| End voltage (OCV) | 3000 mV | 3350 mV | 3450 mV | 3650 mV | 3750 mV | 3850 mV | 3998 mV | 4110 mV | 4150 mV | 4400 mV |
| OCV Range | 2500-3000 mV | 3001-3350 mV | 3351-3450 mV | 3451-3650 mV | 3651-3750 mV | 3751-3850 mV | 3851-3998 mV | 3999-4110 mV | 4111-4150 mV | 4151-4400 mV |
| Charging Current | 140000 mA | 140000 mA | 300000 mA | 200000 mA | 142000 mA | 118000 mA | 115000 mA | 107000 mA | 120000 mA | 100000 mA |
| Duty Cycle | 65 | 65 | 34 | 50 | 70 | 75 | 75 | 60 | 40 | 30 |
| F1 (kHz) | 50 | 70 | 60 | 30 | 30 | 30 | 30 | 50 | 70 | 60 |
| F2 (kHz) | 60 | 80 | 70 | 40 | 40 | 40 | 40 | 60 | 80 | 70 |
| Time Segment Duration (mS) | 100 | 100 | 100 | 100 | 100 | 100 | 100 | 100 | 100 | 100 |
| Sweep wait (mS) | 1000 | 2000 | 2000 | 2000 | 2000 | 2000 | 2000 | 2000 | 2000 | 3000 |
| Number of Sweep segments | 10 | 10 | 10 | 10 | 10 | 10 | 10 | 10 | 10 | 10 |
| Number of Train sweep | 7 | 8 | 8 | 8 | 9 | 9 | 9 | 7 | 7 | 7 |

BATTERY CHARGING WITH CHARGING PARAMETERS SWEEP

CROSS REFERENCE TO RELATED APPLICATIONS

The present application is a continuation application under 35 U.S.C. § 120 of U.S. patent application Ser. No. 16/190,236, filed on Nov. 14, 2018, which is a continuation-in part application under 35 U.S.C. § 120 of U.S. patent application Ser. No. 15/644,498, filed on Jul. 7, 2017, now U.S. Pat. No. 10,135,281, which claims priority under 35 U.S.C. § 119(e) of U.S. Provisional Application No. 62/360,432, filed on Jul. 10, 2016. U.S. patent application Ser. No. 16/190,236, U.S. patent application Ser. No. 15/644,498, and U.S. Provisional Application No. 62/360,432 all of which are incorporated by reference as if fully set forth herein.

BACKGROUND

A "battery" or battery pack may comprise several battery cells. A battery cell typically includes a casing to hold the components the of the battery cell. The battery cell may include an anode (negative electrode) immersed in a suitable electrolyte. The anode may comprise any suitable compound such as porous carbon particles; e.g. graphite particles arranged into sheets. The battery cell may further include a cathode immersed in an electrolyte. The cathode may comprise any suitable metal oxide compound such as cobalt-oxide ($CoO_2$) particles.

A battery discharges, for example, when it is connected across a load. During discharging, ions (e.g., lithium ions) flow through the electrolyte from the negative electrode to the positive electrode. Electrons flow from the negative electrode to the positive electrode through the load. The lithium ions and electrons combine at the positive electrode. When no more Li ions flow for the given discharge potential applied across the cell, the battery can be deemed to be fully discharged.

During charging, the lithium ions flow from the positive electrode to the negative electrode through the electrolyte. Electrons flow through the external charger in the direction from the positive electrode to the negative electrode. The electrons and lithium ions combine at the negative electrode and deposit there. When no more Li ions flow for the given charge potential applied across the cell, the battery can be deemed fully charged and ready to use.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings:

FIG. 12 shows Table I with the OCV value of the battery characterized or divided into a plurality of ranges.

DETAILED DESCRIPTION

During a charging process of the battery cell, electric charge can build up in the battery cell. The battery cell comprises a number of mechanisms to dissipate (discharge) the accumulated charge energy. The dissipation mechanisms are substantially distributed inside the battery cell. It is believed the dissipation mechanisms transfer energy (electric charge) to drive electrochemical reactions in the material of the negative electrode, the surrounding electrolyte, and the lithium ions to redistribute the lithium ions in the negative electrode to the positive electrode. The stored energy can therefore be transformed into ionic storage form, such as the redistribution of lithium ions from the negative terminal to the positive terminal.

Charge dissipation can occur at different rates. The discharge rate can be defined and affected by local levels of accumulated charge in the battery, local properties of the dissipation mechanisms, and so on. Due to such differences, the dissipation time can vary from region to region with the battery cell. These dissipation mechanisms allow for the concurrent discharge of stored energy. Thus, the longest of the dissipation times should be sufficient time for the stored energy to dissipate into chemical form. It has been observed that dissipation times are normally in the range between 0.1 µs and 100 ms.

The present disclosure presents circuits and techniques for pulse charging batteries. Pulse charging in accordance with the present disclosure takes into consideration the foregoing real-time electrochemical and macrokinetic processes that occur within a battery cell. This includes progression of the electrode material's elastic deformations and mechanical impedance changes during lithium ion intercalation and deintercalation. Models of battery cell chemistry can be used in real-time calculations, and electric current bursts (pulses) can be controlled in real-time at microsecond scales.

In the following description, for purposes of explanation, numerous examples and specific details are set forth in order to provide a thorough understanding of the present disclosure. It will be evident, however, to one skilled in the art that the present disclosure as expressed in the claims may include some or all of the features in these examples, alone or in combination with other features described below, and may further include modifications and equivalents of the features and concepts described herein.

Figure 1:
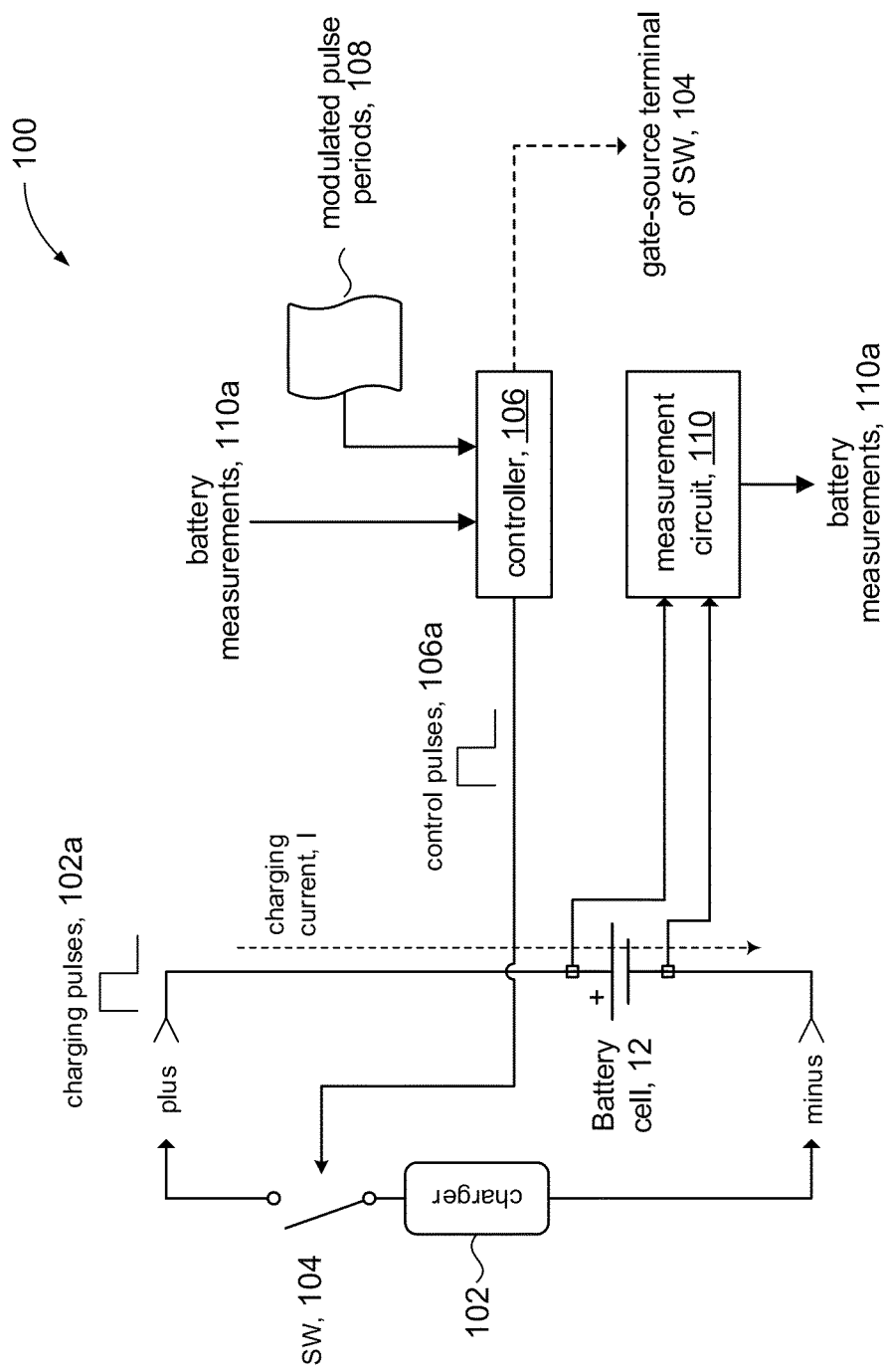
FIG. 1 shows a battery charging circuit in accordance with the present disclosure.

FIG. 1 shows a charging system 100 for charging a battery 12 in accordance with implementations of the present disclosure. The battery 12 can be a lithium-ion battery, and can be a single cell design or a battery pack (not depicted) comprising several battery cells. The battery 12 may have negative (minus) electrode also referred to as the anode, and a positive (plus) electrode also referred to as a cathode.

The charging system 100 can include a charger (also referred to as a power source) 102 to provide power (e.g., current, voltage) to the battery 12 during charging. The charger 102 can be any suitable power source such as, but not limited to, a AC adapter, a capacitive device, another battery, and so on. The charging system 100 can include a switch 104 that can be controlled (ON, OFF) to provide a charging current I from the charger 102 to the battery 12 in bursts (charging pulses 102a) of energy. In some implementations, for example, the switch 104 can be a field effect transistor (FET) device.

The charging system 100 can include a controller 106 configured to operate in accordance with the present disclosure. The controller 106 can generate control pulses 106a that are provided to the switch 104 to control operation of the switch 104 to produce the charging pulses 102a. In accordance with the present disclosure, the controller 106 can modulate the frequency (e.g., pulse period) of the control pulses 106a. For example, the controller 106 can control the duration of the ON period and the OFF period of each control pulse 106a.

In some implementations, the controller 106 can use a lookup table 108 that defines a set of modulated pulse periods. In other implementations, the controller 106 can modulate the pulse periods of the control pulses 106a by computing the pulse periods on the fly; e.g., using a mathematical function. The amplitudes of the control pulses 106a are logic levels, and can vary between logic LO (e.g., $V_{SS}$, such a ground potential) to logic HI (e.g. $V_{DD}$ such as 5V).

The charging system 100 can include a battery measurement circuit 110 to measure the flow of energy (e.g., electrical current) through the battery 12 during charging. In accordance with the present disclosure, battery measurements 110a produced by the battery measurement circuit 110 can be provided to the controller 106. The controller 106 can be configured to generate control pulses 106a that are further based on the battery measurements 110a.

Figure 2A:
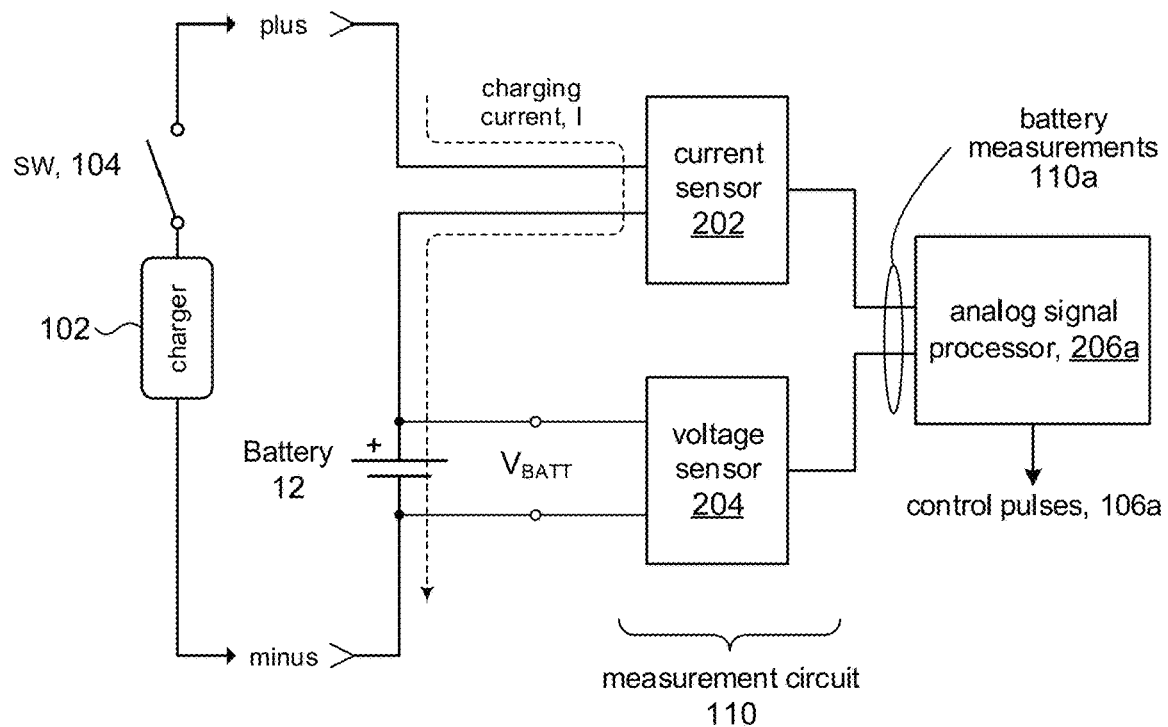
FIGS. 2A and 2B illustrate examples of measurement circuits.
Figure 2B:
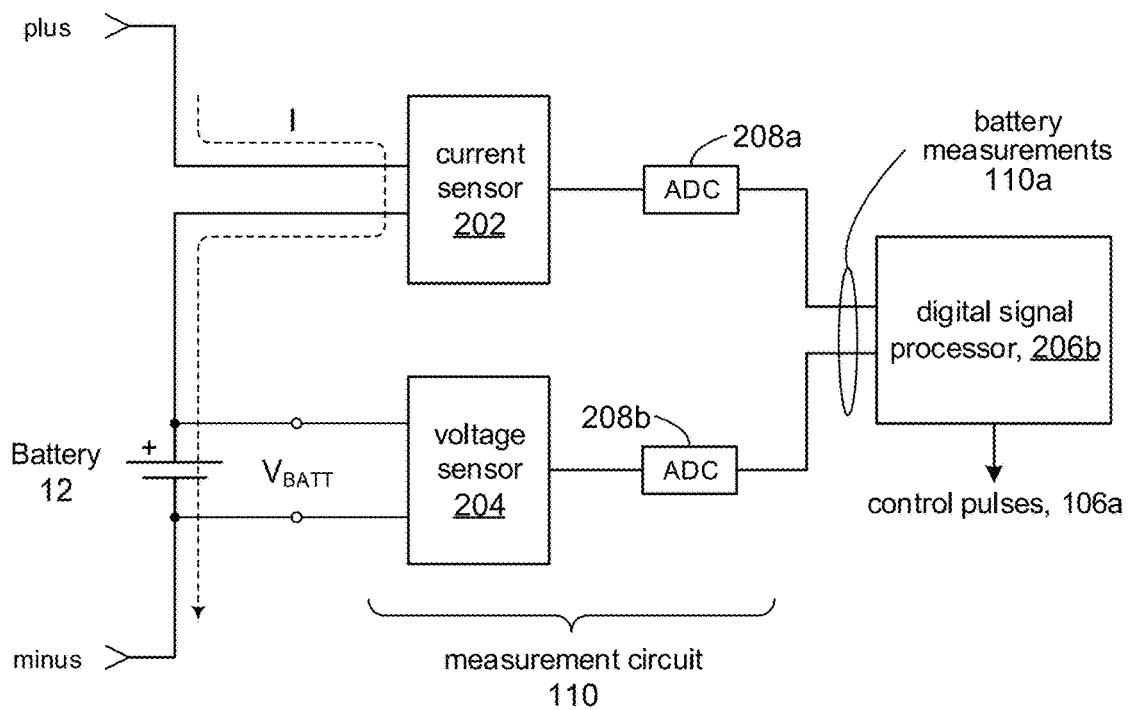

FIGS. 2A and 2B show illustrative examples of a battery measurement circuit 110 in relation to the controller 106. FIG. 2A, for example, shows that in some implementations, the controller 106 can be an analog signal processor 206a. The battery measurement circuit 110 can include a current sensor 202 to measure the flow of charging current I through the battery 12. The current sensor 202 can provide a measure of the charging current I (e.g., in the form of an analog signal) to the analog signal processor 206a. In some implementations, the current sensor 202 may include a sense resistor to measure current and perform the function of a coulomb counter. The battery measurement circuit 110 can further include a voltage sensor 204 (e.g., difference amplifier) to provide the analog signal processor 206a with a measure of the battery voltage.

FIG. 2B depicts an implementation that is digital. The controller 106 can be a digital signal processor (DSP) 206b or other similar digital signal processing unit. The battery measurement circuit 110 can include analog to digital converters (ADCs) 208a, 208b. For example, the output of current sensor 202 can be converted into a suitable digital signal by ADC 208a that can be processed by the DSP 206b. Similarly, the output of voltage sensor 204 can be converted to a digital signal by ADC 208b.

Figure 3:
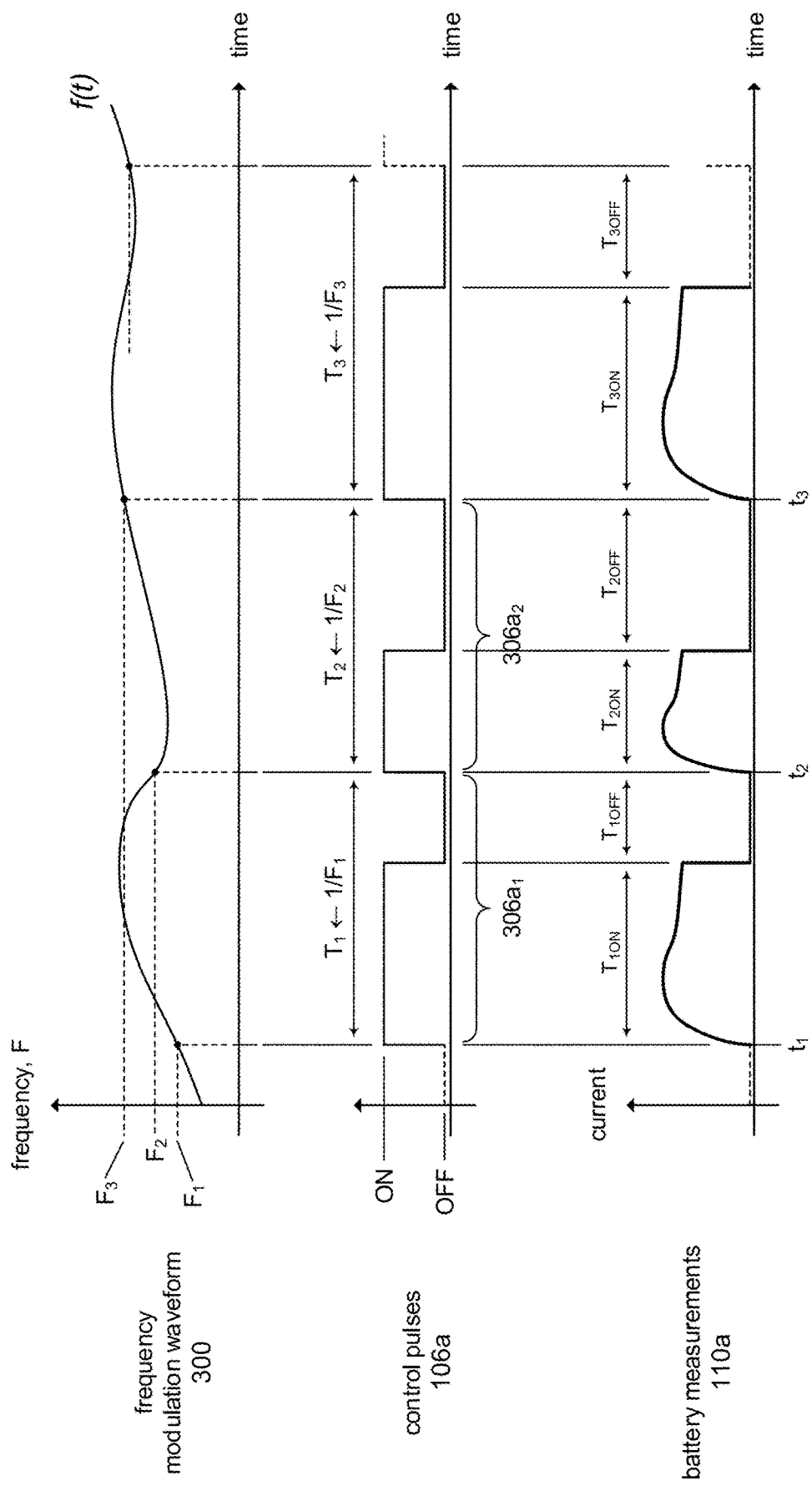
FIG. 3 shows waveforms for pulse charging in accordance with the present disclosure.

Referring now to FIG. 3, modulated pulse charging in accordance with the present disclosure will be explained in terms of the waveforms depicted in the figure. FIG. 3 shows a modulation waveform 300 that is used to specify pulse periods that can be identified, or otherwise associated, with control pulses 106a (and hence the charging pulse 102a). In some implementations, the modulation waveform 300 can be expressed as change in frequency vs. time, as shown in the figure. In other implementations, the modulation waveform 300 can be expressed as change in pulse period vs. time. Thus, with respect to the frequency vs. time waveform in FIG. 3, for a given frequency f taken at time t, the pulse period can be computed by its reciprocal, namely 1/f.

In accordance with the present disclosure, the modulation waveform 300 can be used to select a pulse period (vis-à-vis its frequency) for each of the control pulses 106a based on the timing of the control pulse. Thus, for example, a control pulse $306a_1$ that begins at time $t_1$ will be associated with a pulse period ($T_1$) based on a frequency ($F_1$) on the modulation waveform 300 at time $t_1$. Likewise, a control pulse $306a_2$ at time $t_2$ will be associated with a pulse period ($T_2$) based on a frequency ($F_2$) taken off the modulation waveform 300 at time $t_2$, and so on. Furthermore, in accordance with the present disclosure, each control pulse (e.g., $306a_1$) is "associated" with its respective pulse period ($T_1$) in the sense that the actual pulse period can be different from its associated pulse period. This aspect of the present disclosure is discussed below.

FIG. 3 also shows diagrammatic examples of battery measurements 110a taken by the measurement circuit 110. In some implementations, the battery measurements 110a can be expressed in terms of current flow through the battery 12 as a function of time. As the figure shows, the battery measurements 110a exhibit a response profile during the ON periods ($T_{1ON}$, $T_{2ON}$, etc.) of the control pulses 106a when current is being supplied to the battery 12 by the charging pulses 102a (FIG. 1). In accordance with the present disclosure, the duty cycle of each control pulse 106a can be determined based on the battery measurements 110a. The duty cycle of a pulse is typically computed as the ratio of the ON period of the pulse to the total period of the pulse; e.g., the duty cycle of pulse $306a_1$ can be computed as the ratio $T_{1ON}/(T_{1ON}+T_{1OFF})$.

The waveform shown in FIG. 3 shows that the modulation waveform 300 can be any arbitrary waveform. As FIG. 3 indicates, in some implementations, the modulation waveform 300 can be a continuous function and computed on the fly. In other implementations, the modulation waveform 300 can comprise data points in a lookup table 108.

Figure 4A:
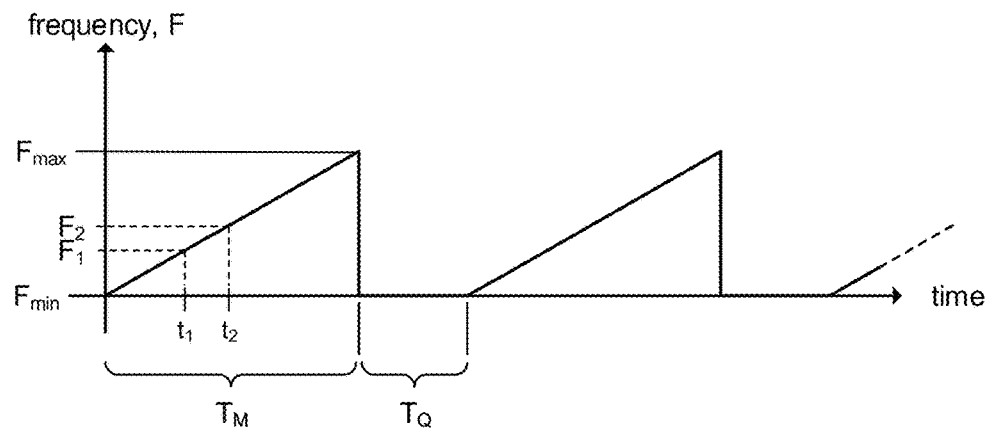
FIGS. 4A, 4B, and 4C illustrate examples of frequency modulation waveforms.
Figure 4B:
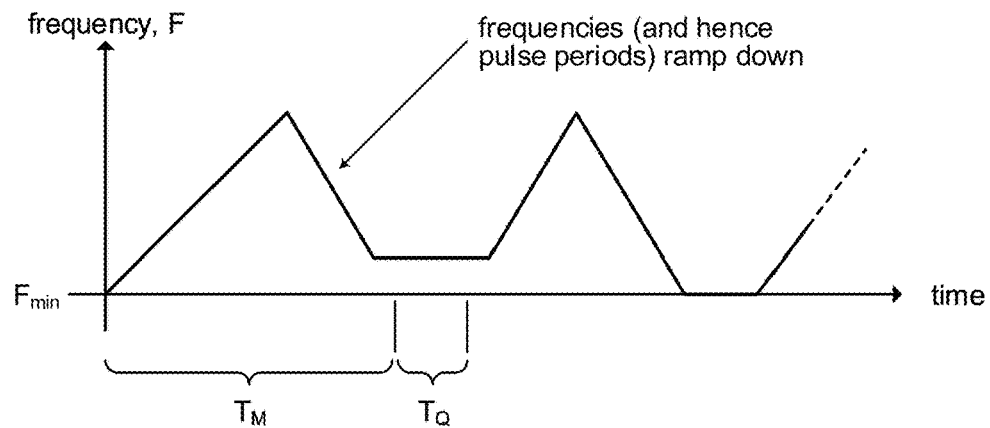
Figure 4C:
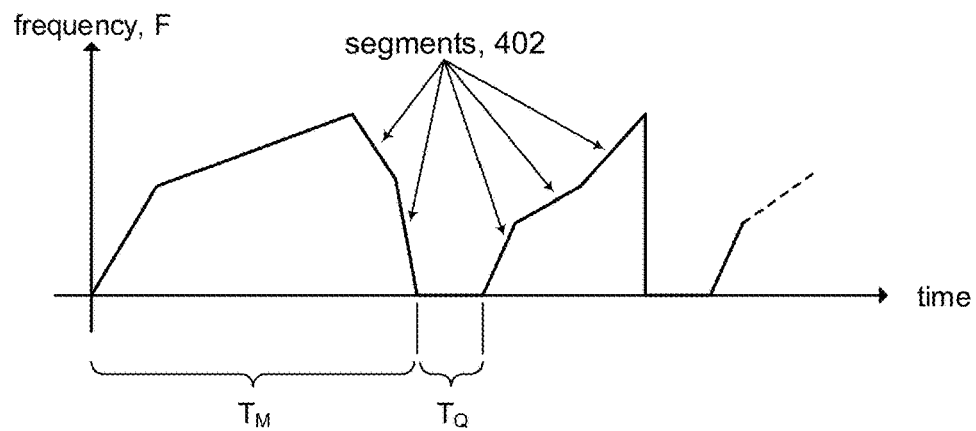

Refer now to FIGS. 4A, 4B, 4C for additional examples of frequency modulation waveforms, in accordance with various implementations of the present disclosure, used to generate pulse periods for the control pulses 106a. FIG. 4A shows an example of a sawtooth type modulation waveform. The modulation waveform can comprise alternating modulation periods $T_M$ and quiescent periods $T_Q$. In various implementations, the modulation period $T_M$ can be on the order of several seconds to tens of seconds. In various implementations, the quiescent period $T_Q$ can be on the order of one to several seconds.

During a modulation period $T_M$, the selected frequency (and hence pulse period) can vary with time; the example shown in FIG. 4A, for example, shows that the pulse period can vary from $1/F_{max}$ to $1/F_{min}$.

In some implementations, the variation in pulse periods can be linear as shown in the figure, and in other implementations, the variation in pulse periods can be other than linear. During a quiescent period $T_Q$, the pulse periods can remain constant, or in some implementations the controller 106 can terminate pulse charging during a quiescent period $T_Q$. The modulation periods $T_M$ can vary in duration, and likewise the quiescent periods $T_Q$ can vary in duration.

FIG. 4B shows that the pulse period can be other than a $1/F_{min}$ in a given quiescent period $T_Q$. The figure further illustrates that the modulation waveform can include portions that ramp down the pulse period as well as ramping up the pulse period.

FIG. 4C shows that a modulation waveform can comprise several segments 402.

Figure 5:
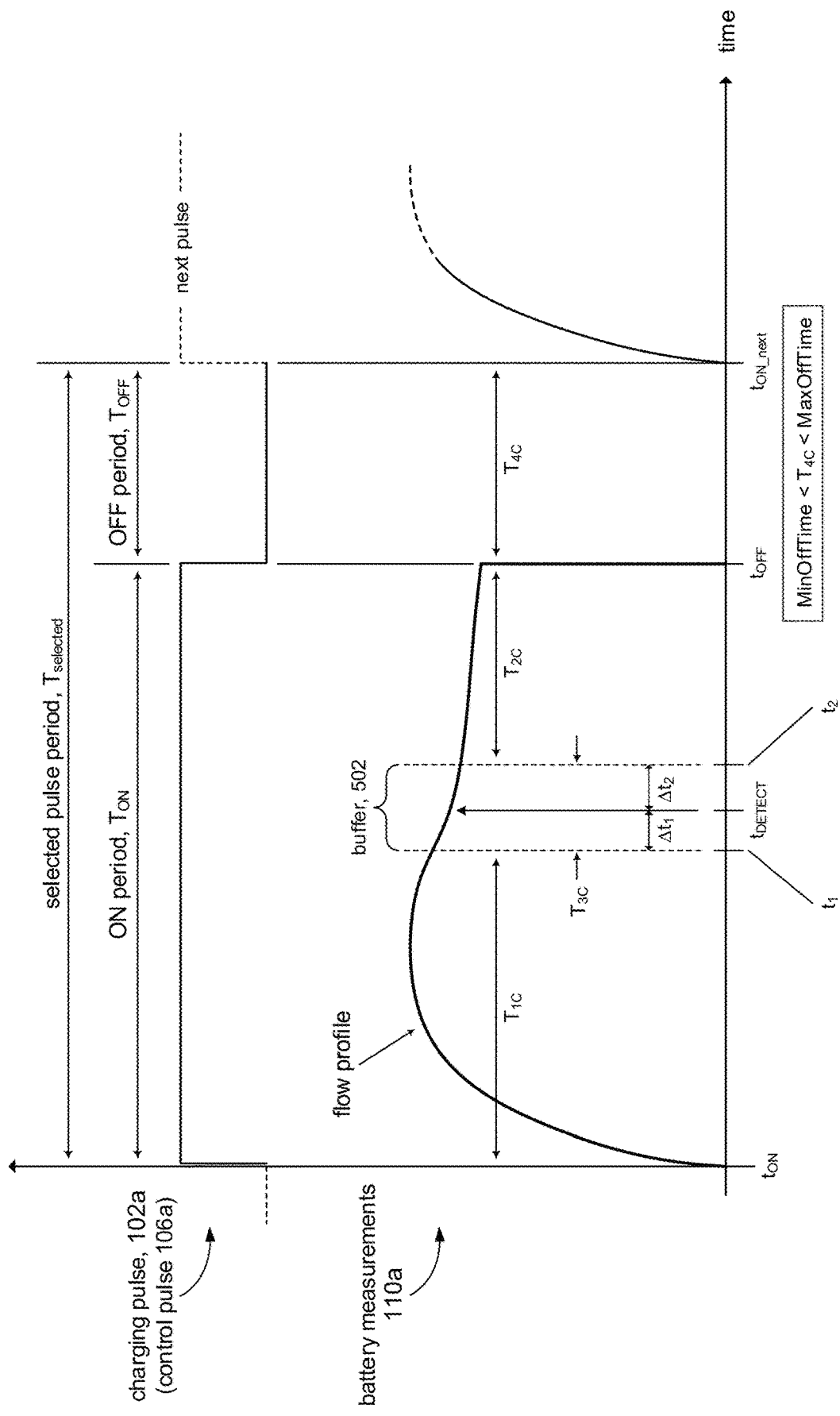
FIG. 5 illustrates details for determining the duty cycle of a charging pulse in accordance with the present disclosure.

Referring now to FIG. 5, the controller 106, in accordance with the present disclosure, can use the battery measurements 110a taken during the time of a charging pulse 102a to determine its duty cycle. Assume for discussion purposes the selected pulse period for charging pulse 102a is $T_{selected}$; e.g., selected from a modulated waveform such as shown FIGS. 4A-4C at a time torr. The charging pulse 102a has an ON period ($T_{ON}$) and an OFF period ($T_{OFF}$). The duration of $T_{ON}$ and $T_{OFF}$ can be dynamically determined based on battery measurements 110a made during the ON period of the charging pulse 102a.

The battery measurements 110a can comprise measurements of current flow through the battery 12. Current flow through the battery 12 can gradually increase from the time torr that the charging pulse 102a is applied and follow the flow profile such as shown in FIG. 5. The flow profile of current through the battery 12 depends factors such as battery chemistry, state of charge, temperature, and the like. In a lithium ion battery, for example, the lithium ions flow from the positive electrode to the negative electrode through the electrolyte. The electrons and lithium ions combine at the negative electrode and deposit there. During a charging pulse, the charge current saturation can occur where additional charge current into the battery 12 for that charging pulse 102a may not be effective and may even be detrimental (e.g., cause heat build up, create mechanical stress).

In accordance with the present disclosure, the controller 106 can analyze or otherwise track the current flow to detect the onset charge current saturation by looking for a change in the flow profile. Suppose at time $t_{DETECT}$ the controller 106 detects such a change in the flow profile. The time of detection $t_{DETECT}$ can be used to determine the duration $T_{ON}$ of the ON period of the charging pulse 102a, for example, in order to limit the charge current into the battery 12. A first time period $T_{1C}$ between torr and $t_{DETECT}$ can be computed by backing off a margin of time $\Delta t_1$ from $t_{DETECT}$, for example, by computing $t1 = t_{DETECT}\Delta t_1$. A buffer 502 comprising the margin of time $\Delta t_1$ and $\Delta t_2$ can be provide around the detection time $t_{DETECT}$ to account for uncertainty in the detection of the onset of charge saturation. The first period $T_{1C}$ can be the period between time torr and time $t_1$.

A second time period $T_{2C}$ can be computed based on keeping the second time period within a predetermined range. During the second time period $T_{2C}$, charge saturation can be a dominant factor during the charging pulse. In some implementations, the second time period $T_{2C}$ can be determined in order to maintain a certain ratio R between $T_{1C}$ and $T_{2C}$. For example, $T_{2C}$ can be computed from the relation: $R = T_{1C}/T_{2C}$, where R can be a predetermined ratio. The ON period $T_{ON}$ can be computed as $T_{ON} = (T_{1C} + T_{2C} + T_{3C})$, where $T_{3C}$ is the width of the buffer 502. By dynamically computing the ON period for each charging pulse 102a, battery charging can be more efficient, battery damage that inherently arises during charging (e.g., heat build up) can be reduced (which can contribute to safety), and battery life can be extended.

In accordance with the present disclosure, the OFF period $T_{OFF}$ of the charging pulse 102a can be computed by subtracting the $T_{ON}$ from the selected pulse period $T_{selected}$. However, if the resulting OFF period is too long, then overall battery charging time can be increased, which is typically undesirable. Accordingly, in accordance with the present disclosure if the $T_{OFF}$ exceeds a predetermined maximum time MaxOffTime, $T_{OFF}$ can be set to MaxOffTime. As a consequence, the actual pulse period of the charging pulse 102a will be different from the selected pulse period $T_{selected}$.

If, on the other hand, the resulting OFF period is too short, then there may not be enough recovery time for various chemical reactions in the battery 12 to run their course before the onset of the next charging pulse; more time may be needed. Accordingly, in accordance with the present disclosure, if the $T_{OFF}$ becomes less than a predetermined minimum time MinOffTime, $T_{OFF}$ can be set to MinOffTime to allow time for the chemical reactions to take place before initiating the next charging pulse. As a consequence, the actual pulse period of the charging pulse 102a will be different from the selected pulse period $T_{selected}$.

The amplitude of the charging current I (FIG. 1) of the charging pulse can vary from one charging pulse to the next, during the charging process. The inventors of the present disclosure have noted that the OFF period of one charging pulse can affect the charging current amplitude. Accordingly, in some implementations, rather than basing the OFF period on the selected pulse period $T_{selected}$, the OFF period can be varied between MinOffTime and MaxOffTime in response to the amplitude of the charging current I.

In some implementations, the output voltage of the charger 102 can be selected for different charging pulses 102a. A reason for doing this is to limit the "headroom" for the current of the charging pulse 102a. The battery impedance can be a highly dynamic parameter whose value can change very quickly. It can be impractical, and in some cases may not be feasible, to use a conventional feedback loop to control the charging current to accommodate for a changing battery impedance. In accordance with some aspects of the present disclosure, the output voltage of the charger 102 can be adjusted to limit its output level so that the current flow (i.e., charging current I, FIG. 1) into the battery 12 does not exceed safety levels. For example, suppose the safety limit sets a peak charging current of the battery 12 to be 35 A. If we expect the battery 12 to have a minimum battery impedance of 100 mΩ, and an open circuit voltage (OCV) of 3.5 V, this establishes a 7V output voltage for the charger 102:

$$3.5V + 35A \times 0.1\Omega = 7V.$$

In other implementations, instead of limiting the output voltage of the charger 102, the switch 104 can be used to limit the flow of charging current I into battery 12. Referring to FIG. 1, for example, the controller 106 can produce an analog output to adjust the gate-source voltage of switch 104 and hence the device channel saturation of the switch 104, to control the charging current I.

The battery impedance can change dynamically from one charging pulse to another. For a given charging pulse, the battery impedance can be at some initial value at the beginning of the charging pulse and at some higher value at the end of the charging pulse. The impedance change during the pulse period can be non-linear in time. The lowest and highest values of the battery impedance during a given charging pulse can vary during the charging process. These impedance changes can be predicted based on impedance values previously recorded during other charges of the battery or based on a mathematical model of the battery.

Figure 6:
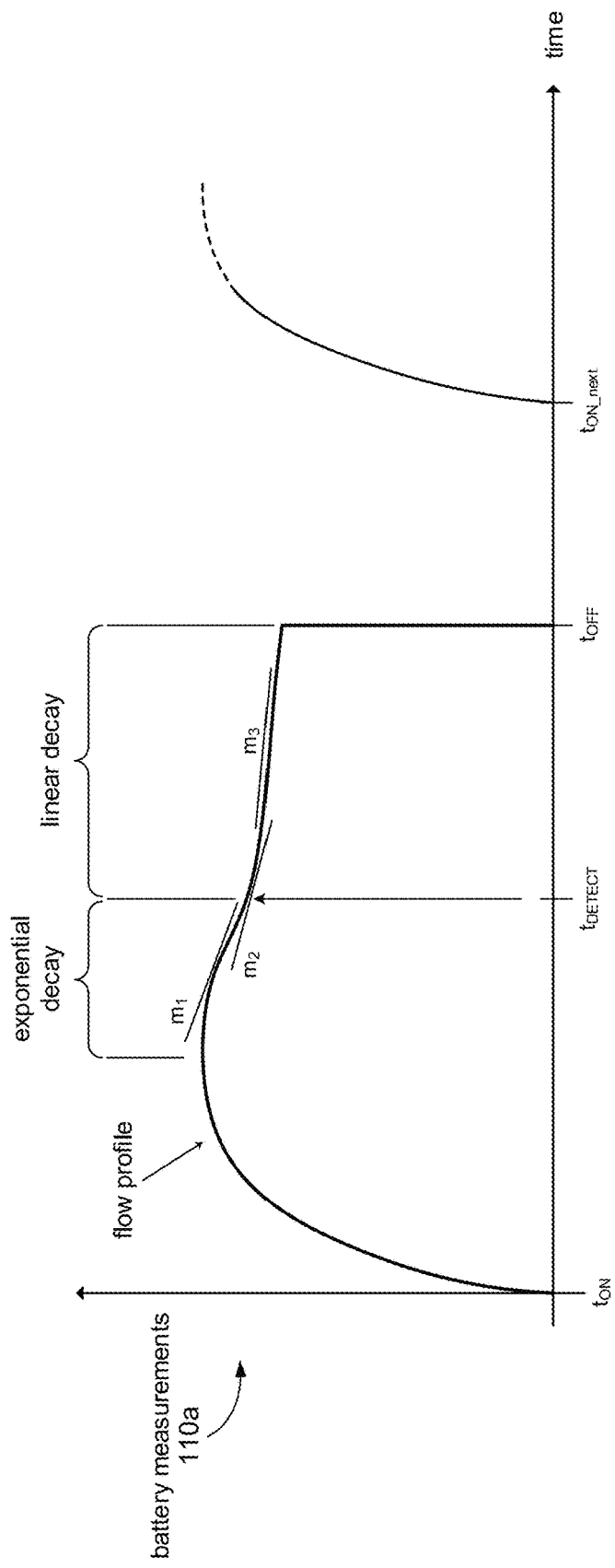
FIG. 6 illustrates details for detecting a change in the current flow through a battery in accordance with the present disclosure.

FIG. 6 illustrates an example of detecting a change in the current flow through the battery that can be indicative of the onset of charge current saturation. In some implementations, for example, the flow profile may include a exponential decay portion and a linear decay portion. The slope of the flow profile can be monitored to detect the transition between the exponential decay portion and the linear decay portion. For example, the slope can be monitored at the onset of the charging pulse at time torr. In some implementations, the monitoring can begin at some time after torr, since saturation does not happen right away. In some implementations, the rate of change of the slope (i.e., second derivative of the flow profile) can be used to determine when the change in the current flow through the battery has occurred. In other implementations, we can monitor for the rate of change of the rate of change (i.e., a third derivative) of the charging current. In particular, we can detect for a change in the sign of the third derivative.

It will be appreciated that other detection techniques can be used. In some implementations, for example, the change can be associated with switching from exponential current decline into linear current decline. In other implementations, detection can be based on switching from one exponential decline into another much slower exponential decline, and so on.

Figure 7:
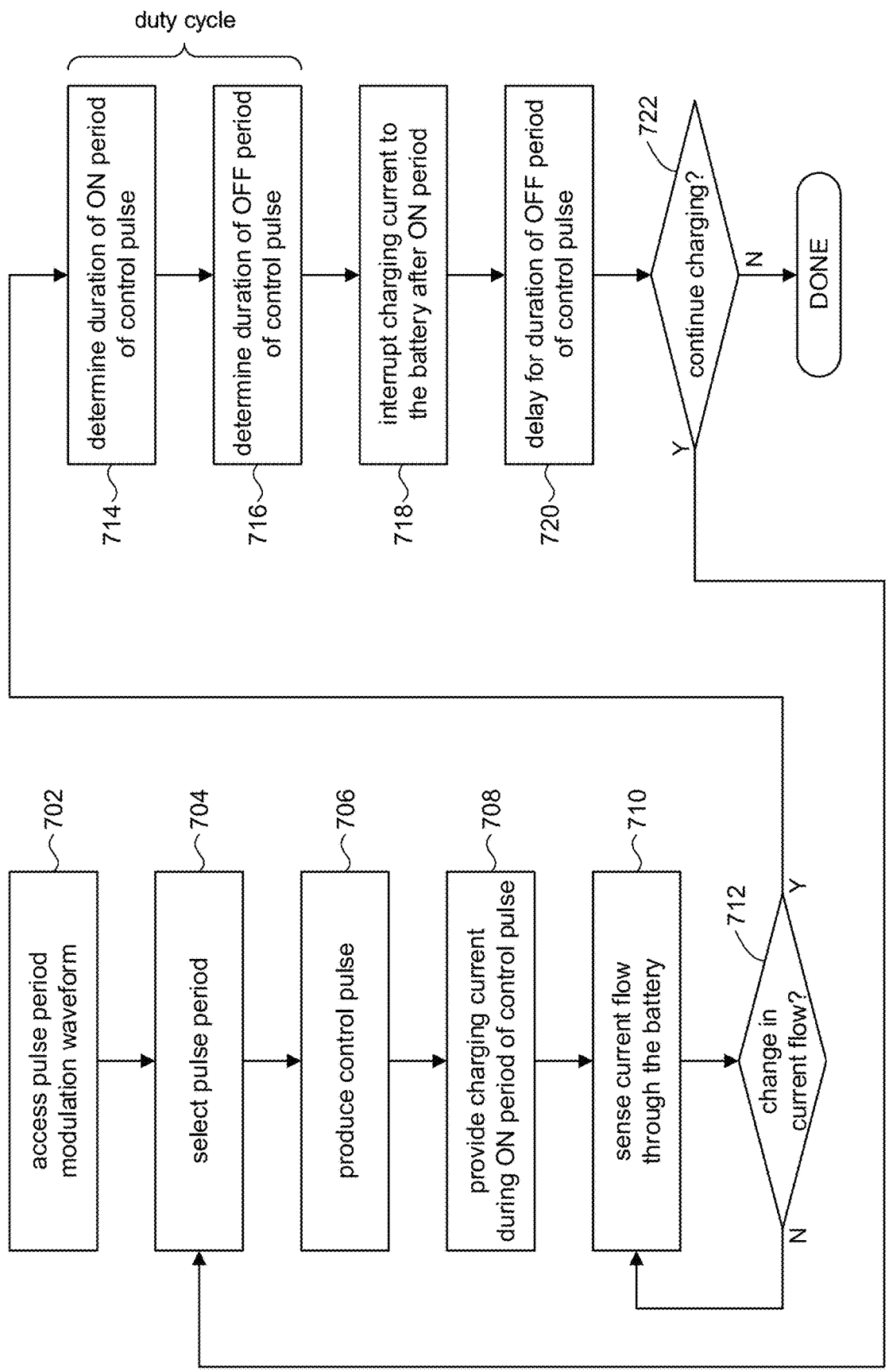
FIG. 7 illustrates a flow diagram for frequency modulated charging of the battery in accordance with some implementations of the present disclosure.

Referring to FIG. 7, the discussion will now turn to a high level description of processing in the controller 106 for generating charging pulses 102a using pulse modulation in accordance with the present disclosure. In some implementations, for example, the controller 106 may include computer executable program code or equivalent firmware (e.g., field programmable gate array, FPGA), which when executed cause the controller 106 to perform the processing in accordance with FIG. 7. The flow of operations performed by the controller 106 is not necessarily limited to the order of operations shown.

At block 702, the controller 106 can access a pulse period modulation waveform (e.g., 300, FIG. 3). In some implementations, the modulation waveform can comprise a set of pre-computed data points stored in a lookup table (e.g., 108, FIG. 1). In other implementations, the controller 106 can compute the pulse periods on the fly.

At block 704, the controller 106 can select a pulse period as a function of time using the modulation waveform. The controller 106 can include a counter to provide a time base.

At block 706, the controller 106 can output a control pulse 106a to turn ON the switch 104, thus providing charging current to the battery 12 (block 708).

At block 710, the controller 106 can sense current flow through the battery 12. In some implementations, for example, the measurement circuit 110 can provide battery measurements 110a to the controller 106. The controller 106 can analyze the battery measurements 110a to detect a change in current flow through the battery 12, for example, that indicates the onset of charge current saturation in the battery 12.

At block 712, the controller 106 continue to sense current flow through the battery 12 if a change in the flow profile has not been detected. Otherwise, processing can continue to block 714.

At block 714, the controller 106 can determine the duration of the ON period $T_{ON}$ of the charging pulse as explained above, using the selected pulse period (block 704), thus establishing a duty cycle of the charging pulse.

At block 716, the controller 106 can determine the OFF period $T_{OFF}$ of the charging pulse. If the ON period for the charging pulse is too short, that can result in too long of an OFF period; in which case, the $T_{OFF}$ can be set to MaxOffTime. Conversely, if the ON period for the charging pulse is too long, that can result in too short of an OFF period; in which case, the $T_{OFF}$ can be set to MinOffTime. Otherwise, $T_{OFF}$ can be set so that the actual pulse period of the charging pulse is equal to the selected pulse period. Alternatively, $T_{OFF}$ can be set to any value between MinOffTime and MaxOffTime in response to the amplitude of the charging current, as discussed above.

At block 718, the controller 106 can turn OFF the switch 104 at the end of the ON period determined at block 714 to interrupt the flow of charging current from the charger 102 to the battery 12.

At block 720, the controller 106 can delay for a period of time equal to $T_{OFF}$ before initiating the next charging pulse. During this delay period, the interruption of charging current from the charger 102 to the battery 12 can be a complete interruption if the switch 104 is fully OFF (i.e., no flow of charging current to the battery). In some implementations, during this delay period, some flow of current from the charger 102 can be provided to the battery 12, for example, by partially turning OFF the switch 104 or controlling the charger 102 to provide a small amount of trickle current to the battery 12. In some implementations, the charger 102 can be controlled to create a reverse flow of current from the battery 12; e.g., a discharge current.

At block 722, the controller 106 can determine whether to continue charging the battery 12 before initiating the next charging pulse. In some implementations, for example, a battery management system (BMS, not shown) can make that determination and signal the controller 106 whether to continue charging or not. If charging continues, then processing can return to block 704 to select the next pulse period.

Figure 8:
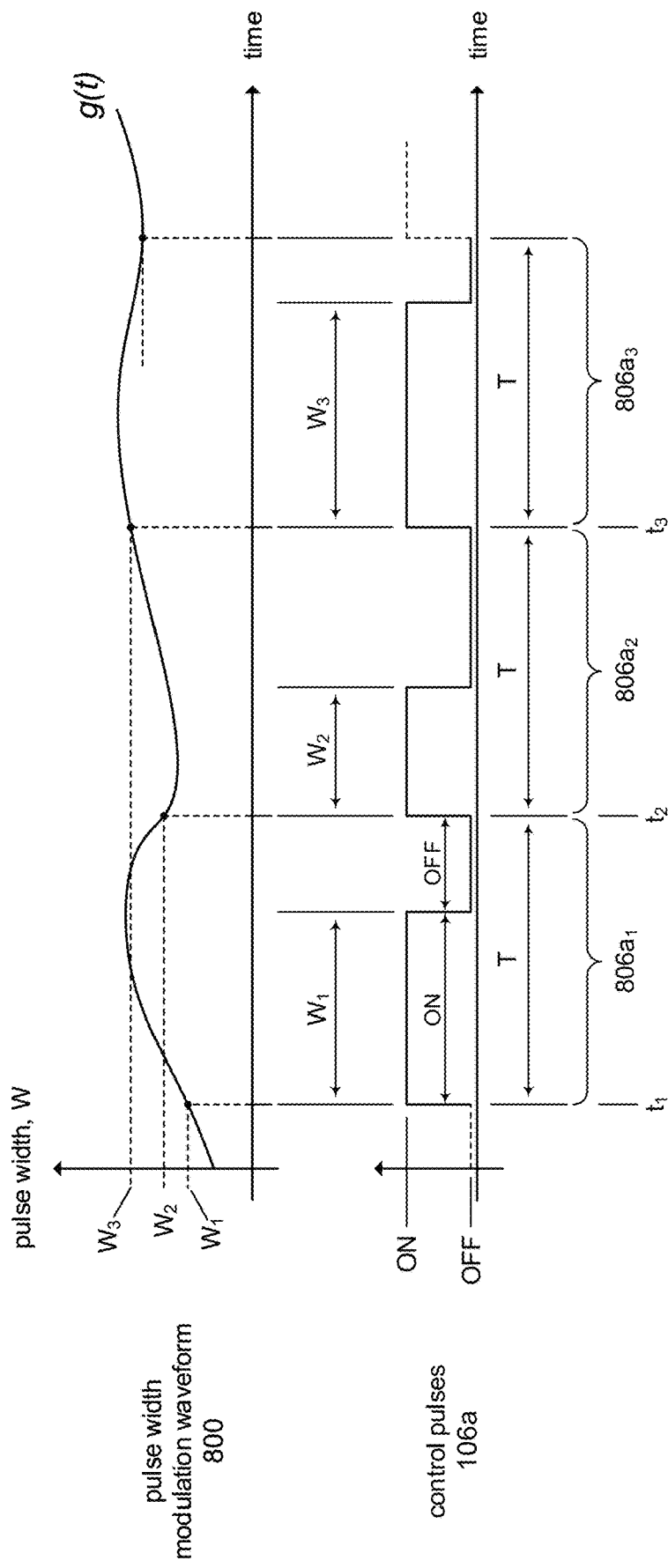
FIGS. 8 and 9 illustrate pulse width modulation in accordance with the present disclosure.

In accordance with some implementations of the present disclosure, the pulse widths of the charging pulses 102a can be modulated. Referring to FIG. 8, in some implementations, a pulse width modulation waveform 800 can be used to specify pulse widths for the control pulses 106a (and hence the charging pulse 102a) as a function of time. In some implementations, the pulse width modulation waveform 800 can be expressed as change in pulse width vs. time, as shown in the figure.

In accordance with the present disclosure, the pulse width modulation waveform 800 can be used to select a pulse width (e.g., $W_1$, $W_2$, $W_3$) for the control pulses 106a (and hence the charging pulse) based on the timing of the control pulse. Thus, for example, a control pulse $806a_1$ that begins at time $t_1$ will be associated with a pulse width ($W_1$) selected from the modulation waveform 800 at time $t_1$. Likewise, a control pulse $806a_2$ at time $t_2$ will be associated with a pulse width ($W_2$) taken off the modulation waveform 800 at time $t_2$, and so on.

The selected pulse width for each control pulse (e.g., $806a_1$) can serve as the ON duration for the control pulse. The OFF duration of the control pulse can be computed as the difference between the pulse period T of the control pulse and the ON duration. In some implementations, such as shown in FIG. 8, the pulse period T can be the same from one charging pulse to another. Consequently, the OFF duration for a given charging pulse can vary depending on the ON duration (selected according to the pulse width modulation waveform 800) for the given charging pulse.

The pulse width modulation waveform 800 can be any arbitrary waveform, such as depicted in FIG. 8. However, in various implementations, the pulse width modulation waveform 800 can have a more regular pattern, such as the frequency modulation waveforms shown in FIGS. 4A-4C.

Figure 9:
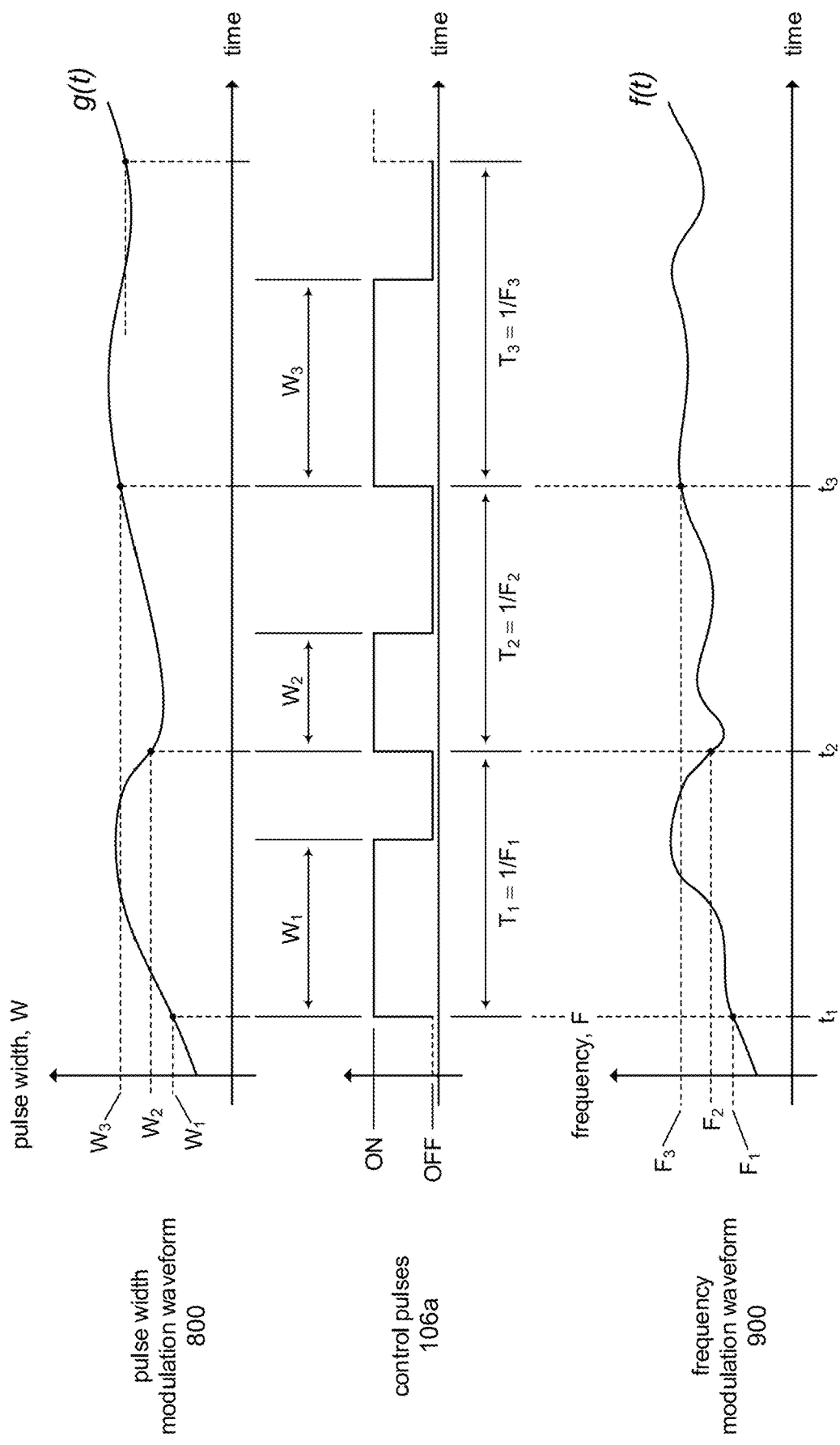

FIG. 9 illustrates that in some implementations, the pulse period can also vary from one charging pulse to another. Thus, for example, a frequency modulation waveform 900 can be used to select the pulse period for each charging pulse. In some implementations, the pulse width modulation waveform 800 can be the same as the frequency modulation waveform 900. In other implementations, the pulse width modulation waveform 800 can be a different waveform from the frequency modulation waveform 900.

Figure 10:
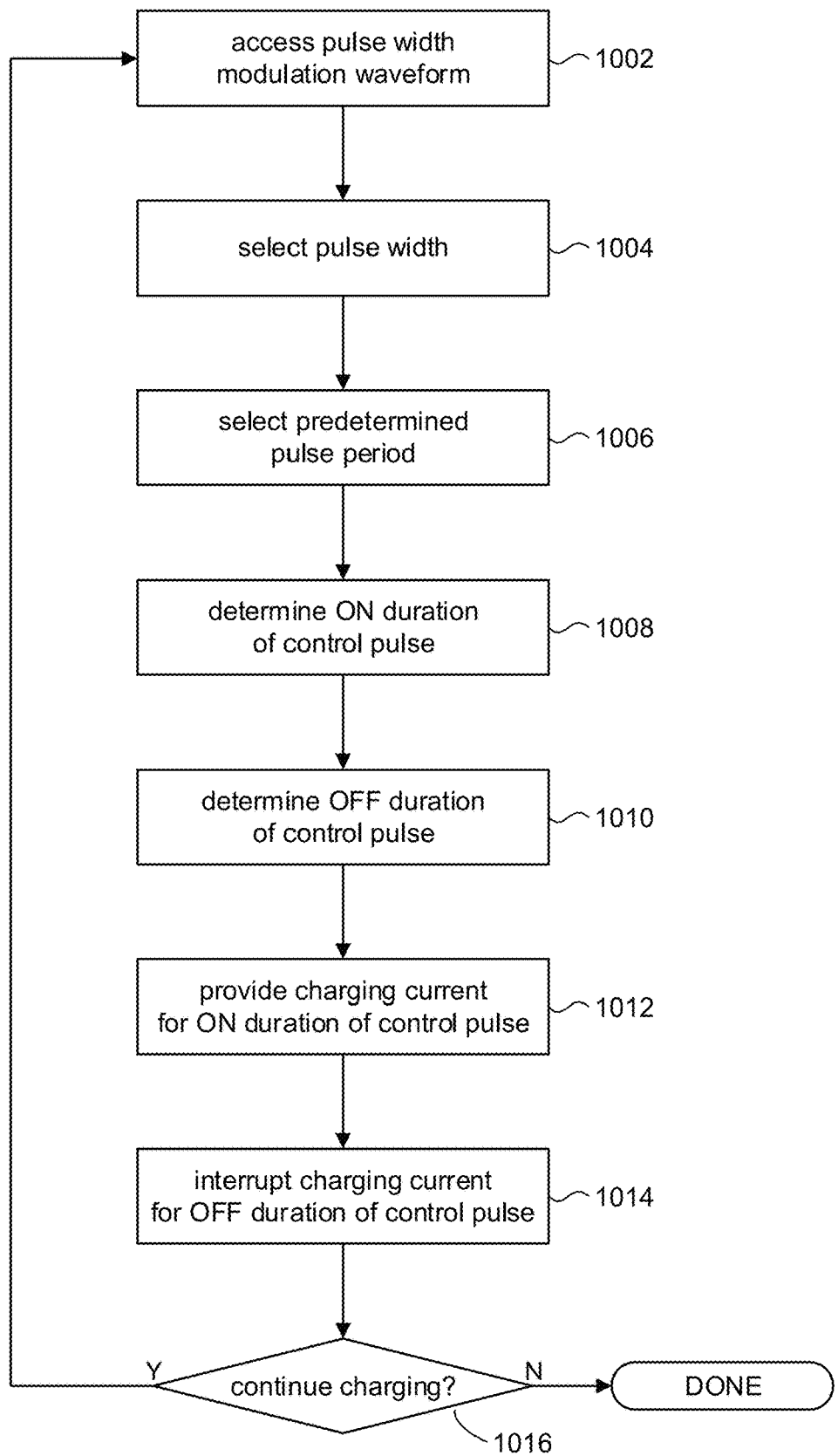
FIG. 10 illustrates a flow diagram for pulse width modulated charging of the battery in accordance with some implementations of the present disclosure.

Referring to FIG. 10, the discussion will now turn to a high level description of processing in the controller 106 for generating charging pulses 102a using pulse width modulation in accordance with the present disclosure. In some implementations, for example, the controller 106 may include computer executable program code or equivalent firmware (e.g., field programmable gate array, FPGA), which when executed cause the controller 106 to perform the processing in accordance with FIG. 10. The flow of operations performed by the controller 106 is not necessarily limited to the order of operations shown.

At block 1002, the controller 106 can access a pulse width modulation waveform (e.g., 800, FIG. 8). In some implementations, the modulation waveform can comprise a set of pre-computed data points stored in a lookup table (e.g., 108, FIG. 1). In other implementations, the controller 106 can compute the pulse periods on the fly.

At block 1004, the controller 106 can select a pulse width as a function of time using the modulation waveform.

At block 1006, the controller 106 can select a predetermined pulse period. In some implementations, the predetermined pulse period can be the same value for each charging pulse. In other implementations, a frequency modulation waveform (e.g., 900, FIG. 9) can be used to select a pulse period as the predetermined pulse period.

At block 1008, the controller 106 can compute or otherwise determine an ON duration of the control pulse. In some implementations, for example, the controller 106 can use the selected pulse width (block 1004) for the ON duration.

At block 1010, the controller 106 can compute or otherwise determine an OFF duration of the control pulse. In some implementations, for example, the controller 106 the OFF duration can be the difference between the predetermined pulse period (block 1006) and the ON duration (block 1008).

At block 1012, the controller 106 can provide a charging current to the battery 12 (i.e., the charging pulse 102a) for a period of time substantially equal to the ON duration.

At block 1014, the controller 106 can interrupt the charging current to the battery 12 for a period of time substantially equal to the OFF duration before applying the next charging pulse. The ON duration and the OFF duration define the period of the charging pulse. As explained above for block 720, the charging current can to the battery 12 can be completely interrupted (i.e., no charging current flow to the battery), or in some implementations, a small (e.g., trickle) current flow can be provided to the battery. In other implementations, a reverse flow of current from the battery 12 can be created (e.g., a discharge current).

At block 1016, the controller 106 can controller 106 determine whether to continue charging the battery 12 before initiating the next charging pulse. In some implementations, for example, a battery management system (BMS, not shown) can make that determination and signal the controller 106 whether to continue charging or not. If charging continues, then processing can return to block 1002 to select the next pulse width.

With reference to FIG. 1, it is described that the controller 106 may use a lookup table 108 that defines a set of modulated pulse periods for charging pulses. The lookup table (e.g., lookup table 108) can also be used to select values of multiple pulse parameters or charging parameters for charging the battery 12. One such implementation of selecting the pulse parameters or charging parameters of charging current (charging pulses), for charging the battery, by using the lookup table is described with reference to FIG. 11.

Figure 11:
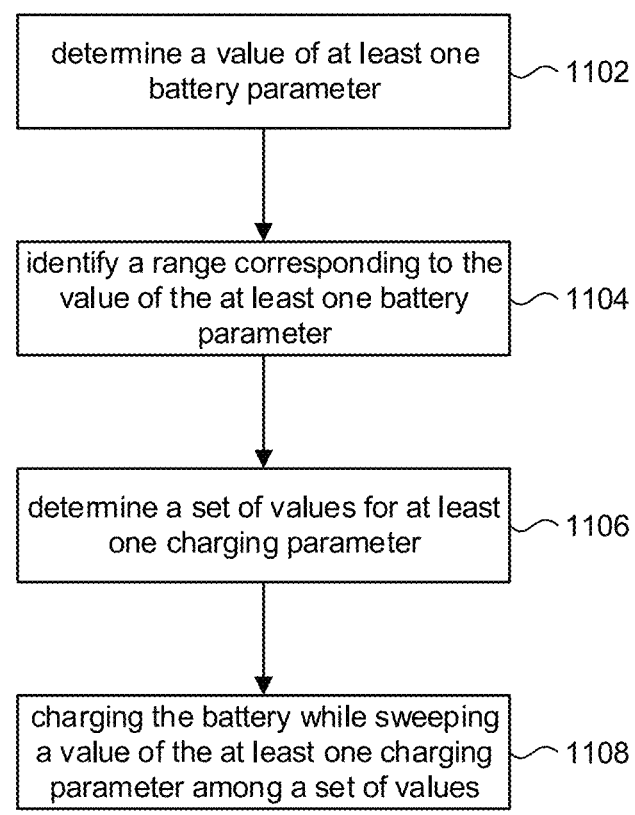
FIG. 11 illustrates a flow diagram for battery charging in accordance with some implementations of the present disclosure.

Referring to FIG. 11, the discussion will now turn to a high level description of processing in the controller 106 for charging the battery 12 in accordance with another aspect of the present disclosure. In some implementations, for example, the controller 106 may include computer executable program code or equivalent firmware (e.g., field programmable gate array, FPGA), which when executed cause the controller 106 to perform the processing in accordance with FIG. 11. In some implementations, for example, the controller 106 may execute instructions stored in a non-transitory computer-readable storage medium, which may cause the controller 106 to perform or control performance of operations in accordance with FIG. 11. The controller 106 may include one or more microprocessors, microcontrollers, DSPs (digital signal processors), state machines, logic circuitry, or any other device or devices that process information based on operational or programming instructions stored in the non-transitory computer-readable medium. The non-transitory computer-readable storage medium can be an integrated-circuit (IC) memory chip containing any form of random-access memory (RAM), a floppy disk, a compact disk with read write (CD-RW), a hard disk drive, a digital versatile disc with read write (DVD-RW), a flash memory card, external subscriber identity module (SIM) card or any other medium for storing digital information. The flow of operations performed by the controller 106 is not necessarily limited to the order of operations shown.

At block 1102, the controller 106 may determine a value of at least one battery parameter. In some implementations, for example, the controller 106 may obtain battery measurements of the battery (e.g., battery 12, FIGS. 2A, 2B) from a battery measurement circuit (e.g., measurement circuit 110, FIGS. 2A, 2B), and determine the value of one or more battery parameters from the obtained battery measurements. By a way of non-limiting example, the battery parameters may include an open circuit voltage (OCV), a state-of charge (SoC), and a battery charge throughput of the battery 12. As known in the art, the OCV of the battery is defined by a difference of electric potential between two terminals of the battery when no external electric current flows between the terminals of the battery. The controller 106 may determine a value of OCV of the battery from OCV measurements done using a voltage sensor (e.g., voltage sensor 204, FIGS. 2A, 2B). The SoC of the battery is indicative of a current charging state of the battery. The SoC of the battery is generally defined as the available capacity expressed as a percentage of current capacity of the battery. For example, the SoC of the battery may be defined as the percentage of the charge left in the battery divided by the battery rated capacity. In other words, the SoC is the ratio of the charge stored in the battery to the maximum charge that the battery can hold. In some implementations, the controller 106 may estimate SoC of the battery 12 by employing known approaches such as coulomb counting using a current sensor (e.g., current sensor 202, FIGS. 2A, 2B). In some implementations, the controller 106 may determine value of battery charge throughput of the battery 12 by determining a number of coulombs in and out of the battery during lifetime of the battery till that time. The sum of the coulombs in and out of the battery during its lifetime represent the battery charge throughput. The controller 106 may be configured to store data (e.g., coulombs in and out data) for calculating the battery charge throughput. In some implementations, the coulomb counting done by the current sensor (e.g., current sensor 202, FIGS. 2A, 2B) may be used by the controller 106 to determine the battery charge throughput of the battery 12.

At block 1104, the controller 106 can identify a range of values to which the determined value of the at least one battery parameter corresponds to. In accordance with the present disclosure, the extent of the value of the battery parameter, for example, from the minimum possible value to the maximum possible value (which may depend on the type of the battery) may be divided into various ranges and stored in a table (e.g., lookup table), in which battery parameter ranges for battery parameter values are mapped to values (e.g., set of values) of various charging parameters. In some implementations for example, the lookup table can be stored in the non-transitory computer readable storage medium. One such example lookup table is illustrated below as table I (generated for LCO (lithium cobalt oxide) 18650 battery cell).

As can be seen in Table I in FIG. 12, the OCV value of the battery is characterized or divided into a plurality of ranges. For example, range I corresponds to a value of the OCV from 2501 mV (millivolts) to 3000 mV, range II corresponds to a value of the OCV from 3001 mV to 3350 mV and so on. It is to be noted that various battery parameters and corresponding range values, battery parameters, charging parameters and their values, various other parameters and values depicted in table I are for illustration purposes only and in no way limit the scope of the disclosure.

At block 1104, for example, when the value of the OCV is 2750 mV, the controller 106 identifies that the value of the OCV corresponds to range I (2501-3001 mV). The table I depicted here includes OCV as the battery parameter. However, other battery parameters such as SoC, battery charge throughput etc. can also be stored in the lookup table with their value ranges mapped to set of values of the one or more charging parameters.

At block 1106, the controller 106 may determine a set of values for at least one charging parameter based on the identified range of the value of the battery parameter. In some implementations, the controller 106 may determine the set of values for the at least one charging parameter by referring to a lookup table (e.g., table I) in which various ranges of the battery parameter(s) values are mapped to a set of values of the charging parameter(s) (e.g., frequency of the charging pulses). The charging parameters may be defined as parameters of the charging current (or charging pulses) applied to the battery to charge the battery. The charging parameters, may include, but not limited to, duty cycle of charging pulses, a frequency of the charging pulses, an ON time of the charging pulses, an OFF time of the charging pulses, charging current amplitude etc. As can be seen in Table I, the various charging parameters such as, but not limited to, charging current, duty cycle of charging pulses, frequency of charging pulses etc. are mapped to the battery parameter OCV ranges. For each OCV range, the value of various charging parameters may differ. In some implementations, at least one of the charging parameter (e.g., frequency of charging pulses in Table I) may have a set of values mapped to each range of the battery parameter value (e.g., range of OCV in Table I). For example, when the identified range of the OCV value corresponds to range I, the set of values of the frequency of charging pulses (charging parameter) includes frequency values of 50 kHz and 60 kHz, which are mapped to range I (2500 mV-3000 mV) of the OCV value of the battery. Similarly, value(s) of other charging parameters based on the identified range of the value of the battery parameter (e.g., OCV) can also be determined by the controller 106.

At block 1108, the controller 106 may control charging of the battery 12 by sweeping a value of the charging parameter (e.g., frequency of the charging pulses) among the identified set of values. The controller 106 may facilitate supply of charging current from the charger (e.g., 102, FIGS. 2A, 2B) to charge the battery 12 while sweeping the value of the charging parameter among the identified set of values. The sweeping of the value of the charging parameter may include varying charging parameter (of the charging pulses, for example) to have a value between the identified set of values at any point in time while the battery is being charged. For example, the controller 106 may initiate providing charging pulses of frequency 50 kHz (first value in set of values for the frequency of charging pulses identified at first point in time) to the battery 12 to charge the battery 12 (e.g., by obtaining charging current from the charger 102). Then, the controller 106 may increase the value of the frequency of charging pulses applied to the battery 12 from 50 kHz to reach 60 kHz (second value among the identified set of values for the frequency of charging pulses) at a second point in time. The first point in time and the second point in time can be separated by a predefined time segment duration. For example, Table I includes value of the predefined time segment duration to be 100 ms (mapped to the OCV range I). Hence, continuing the above example, when the value of the charging parameter OCV corresponds to range I in table I, the controller 106 may sweep (increase) the value of the frequency of charging pulses from 50 kHz to 60 kHz in 100 ms ("time segment duration"). The change in the frequency can be a step-wise change. Such steps are defined by the parameter "number of sweep segments" in Table I. For example, the value of the number of sweep segments corresponding to OCV range I is 10. So, the controller 106 may sweep the value of the frequency of charging pulses from 50 kHz to 60 kHz in 10 steps in 100 ms. In particular, the controller 106 may increase the value of frequency of charging pulses from 50 kHz to 51 kHz in 10 ms, then from 51 kHz to 52 kHz in next 10 ms and continue to do so to reach the value of 60 (sic) kHz in 100 ms. Thus, the battery 12 is charged with charging pulses having the frequency repeatedly transitioned from the first value of 50 kHz to the second value of 60 kHz in a fixed time duration.

In some implementations, instead of step-wise change in the value of at least one charging parameter, the sweeping of the value of the at least one charging parameter among the set of values includes cyclically varying the value of the at least one charging parameter among the set of values as a function of time by employing the mathematical function such as sinusoidal function, cosine function, triangular function, trapezoidal function, saw-tooth function etc. In other words, the value of the charging parameter may vary from one value to another value in time according to the mathematical function. Continuing with the above example, the frequency of the charging pulses may transition from 50 kHz to 60 kHz in a predefined time duration such that the value of frequency of charging pulses at any point in time during the transition is based on the mathematical function. The change in the value of the at least one charging parameter can be a linear/nonlinear change (increase or decrease) depending upon the type of mathematical function employed.

Similar, to the increase of the frequency of charging pulses from the first value to the second value, the sweeping of the value of the charging parameter may include decreasing the value of the charging parameter from the highest value in the set of values to the lowest value in the set of values of the charging parameter. For example, once the value of the frequency of charging pulses reaches 60 kHz at second point in time, the controller 106 may decrease the value of the frequency to be 50 kHz at third point in time. The decrease of the value of frequency from the second value to the first value can be step-wise decrease or mathematical function based decrease in a predefined time duration similar to the increase of value of the frequency of the charging pulses from the first value to the second value.

In some implementations, the value of the charging parameter is swept from one value to another value, of the determined set of values, and/or vice versa, for a fixed number of cycle which is based on the battery parameter value and/or range. Such fixed number of cycles are represented by the parameter "number of train sweep" in Table I. As for the previously discussed example, the controller 106 sweeps the value of the frequency from 50 kHz to 60 kHz seven times (see value of number of train sweep for OCV range I in Table I) before waiting for a time duration which may also be defined in a lookup table. Such wait duration may be defined by a parameter "sweep wait". Continuing with the same example, the controller 106 sweeps the value of the frequency of charging pulses from 50 kHz to 60 kHz for seven cycles before waiting for a time duration of 1000 ms (see value of sweep wait for the OCV range I in Table I). During the sweep wait time, the controller 106 may determine whether the value of the battery parameter (e.g., OCV value) has changed and now corresponds to another range. If the value of the battery parameter has not changed, or changed but belongs to same range of battery parameter values, the controller 106 may continue charging the battery by sweeping the value of the charging parameter between the same set of values. If the value of the battery parameter changes and now corresponds to another range, the controller 16, upon identification of the another range to which the value of the battery parameter now corresponds to, determines another set of values for the charging parameter (based on the another range of values for the battery parameter), and then the process of sweeping the value of the charging parameter to charge the battery 12 is repeated. As discussed above, the controller 106 may obtain battery measurements from the battery measurement circuit periodically to make such determinations. The process of sweeping the value of the battery parameter(s) may continue until the battery is fully charged or until the battery is charged to predefined SoC.

In example table I above, the set of values for the charging parameter (e.g., frequency of charging pulses) includes two values. However, the number of such values in the set of values is not limited to two and can be selected to be any number greater than or equal to two. Also, in example table I above, the charging parameter of charging pulses frequency is shown to have a set of values for each range of values of the battery parameter (OCV), and whereas other charging parameters such as charging current and duty cycle of charging pulses are shown to have a single value mapped to each OCV range of values. However, other lookup tables similar to table I can be generated and implemented, where multiple charging parameters such as charging current, duty cycle, ON time, and/or OFF time of the charging pulses etc. may have multiple values (set of values) for each range corresponding to the one or more battery parameters. All such implementation variations are within the spirit and scope of the present disclosure.

The inventors of this disclosure have noted that by sweeping the value of the one or more charging parameters among a set of values, based on the value of the battery parameter(s), as disclosed above with respect to FIG. 11 enhances the cycle life as well as calendar life of the battery due to reduced degradation of the battery. Also, the charging time to charge the battery is observed to be reduced due to sweep of the value of the one or more charging parameters.

The values of the charging parameters for charging the battery (as defined in example table I) can be determined by characterizing the battery. For example, during battery characterization, various values, including the set of values, for various charging parameters can be determined and such values can be stored in a table, such as lookup table I. The selected values may differ depending on a type of the battery being tested and characterized.

During battery characterization, battery may be charged and discharged for a plurality of charge-discharge cycles by employing various charging parameters values. Then, the performance of the battery in terms of cycle life, calendar life, and speed of charging, temperature growth inside the battery etc., may be ascertained for various charging parameters. Based on the analysis of performance vs. charging parameters values, a constellation of charging parameters values may be selected, which are determined to be optimal for the best performance of the battery. The selected charging parameters values may be determined corresponding to various values of battery parameters and stored in a lookup table. In some implementations, the mathematical function to be employed for sweeping of the charging parameter(s) value(s) may also be determined based on such analysis.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

What is claimed is:

1. A method to charge a battery, the method comprising:
 determining a value of at least one battery parameter;
 identifying a range of values to which the value of the at least one battery parameter corresponds to;
 determining, based on the identified range of values, a set of values for at least one charging parameter; and
 charging the battery while sweeping a value of the at least one charging parameter among the set of values, wherein sweeping the value of the at least one charging parameter among the set of values comprises step-wise varying the value of the at least one charging parameter from a first value to a second value, and from the second value to the first value, of the set of values, for the at least one charging parameter, and wherein step-wise varying the value of the at least one charging parameter comprises:

selecting the first value as the value of the at least one charging parameter at a first point in time;

charging the battery by increasing the value of the at least one charging parameter in a number of steps so that the value of the at least one charging parameter increases to the second value from the first value at a second point in time; and charging the battery by decreasing the value of the at least one charging parameter in the number of steps so that the value of the at least one charging parameter decreases to the first value from the second value at a third point in time.

2. The method of claim 1, wherein sweeping the value of the at least one charging parameter comprises sweeping the value of the at least one charging parameter among the set of values, until a determination is made that the value of the at least one battery parameter has changed and corresponds to a different range of values.

3. The method of claim 1, further comprising:
determining that the value of the at least one battery parameter has changed and corresponds to another range of values;
determining, based on the other range of values, another set of values for the at least one charging parameter; and
charging the battery while sweeping the value of the at least one charging parameter among the other set of values.

4. The method of claim 1, wherein determining the set of values for the at least one charging parameter comprises selecting the set of values from a lookup table.

5. The method of claim 4, wherein the lookup table is generated during characterization of the battery, and wherein the lookup table comprises a plurality of ranges, corresponding to the value of the at least one battery parameter, mapped to a plurality of sets of values for the at least one charging parameter.

6. The method of claim 5, wherein a value of the number of steps is defined in the look-up table.

7. The method of claim 1, wherein determining the value of the at least one battery parameter comprises measuring the value of the at least one battery parameter.

8. The method of claim 1, wherein determining the value of the at least one battery parameter comprises determining at least one of: an open circuit voltage (OCV), a state of charge (SoC), a battery charge throughput, of the battery.

9. The method of claim 1, wherein determining the set of values for the at least one charging parameter comprises determining the set of values for at least one of: a duty cycle of charging pulses, a frequency of charging pulses, an ON time of charging pulses, an OFF time of charging pulses, and charging current.

10. An apparatus to charge a battery, the apparatus comprising:
a controller; and
a non-transitory computer-readable storage medium configured to store instructions, wherein the instructions, in response to execution, by the controller, cause the controller to perform or control performance of operations that comprise:
determine a value of at least one battery parameter;
identify a range of values to which the value of the at least one battery parameter corresponds to;
determine, based on the identified range of values, a set of values for at least one charging parameter; and
charge the battery while a value of the at least one charging parameter is swept among the set of values, wherein the operation to charge the battery comprises at least one operation to step-wise vary the value of the at least one charging parameter from a first value to a second value, and from the second value to the first value, of the set of values for the at least one charging parameter, and wherein the operation to step-wise vary the value of the at least one charging parameter comprises:
select the first value, of the set of values, as the value of the at least one charging parameter at a first point in time;
charge the battery while the value of the at least one charging parameter is increased in a number of steps so that the value of the at least one charging parameter is increased to the second value from the first value at a second point in time; and
charge the battery while the value of the at least one charging parameter is decreased in the number of steps so that the value of the at least one charging parameter is decreased to the first value from the second value at a third point in time.

11. The apparatus of claim 10, wherein the operation to determine the set of values for the at least one charging parameter comprises at least one operation to select the set of values from a lookup table, and wherein the selected set of values is mapped to the identified range of values in the lookup table.

12. The apparatus of claim 11, wherein a value of the number of steps is defined in the look-up table.

13. The apparatus of claim 10, wherein the at least one battery parameter comprises one of: an open circuit voltage (OCV), a state of charge (SoC), a battery charge throughput, of the battery.

14. The apparatus of claim 10, wherein the at least one charging parameter comprises one or more of: a duty cycle of charging pulses, a frequency of charging pulses, an ON time of charging pulses, an OFF time of charging pulses, and charging current.

15. A system, comprising:
a battery comprising one or more battery cells;
a non-transitory computer-readable storage medium configured to at least store a lookup table; and
a controller operatively coupled to the non-transitory computer-readable storage medium and to the battery, wherein the controller is configured to:
determine a value of at least one battery parameter;
identify a range of values to which the value of the at least one battery parameter corresponds to;
select, from the lookup table, a set of values for at least one charging parameter, wherein the set of values is mapped to the identified range of values in the lookup table; and
charge the battery while a value of the at least one charging parameter is swept among the set of values, wherein the operation to charge the battery comprises at least one operation to step-wise vary the value of the at least one charging parameter from a first value to a second value, and from the second value to the first value, of the set of values for the at least one charging parameter, and wherein the operation to step-wise vary the value of the at least one charging parameter comprises:
select the first value, of the set of values, as the value of the at least one charging parameter at a first point in time,
charge the battery while the value of the at least one charging parameter is increased in a number of steps so that the value of the at least one charging parameter is increased to the second value from the first value at a second point in time, and
charge the battery while the value of the at least one charging parameter is decreased in the number of steps so that the value of the at least one charging parameter is decreased to the first value from the second value at a third point in time.

16. The system of claim 15, wherein the controller is further configured to:
determine that the value of the at least one battery parameter has changed and corresponds to another range of values;
select, from the lookup table, another set of values for the at least one charging parameter; and
charge the battery while the value of the at least one charging parameter is swept among the other set of values.

17. The system of claim 15, wherein the lookup table is specific for a type of the battery.

18. The system of claim 15, further comprising:
a battery measurement circuit configured to measure the value of the at least one battery parameter, wherein the controller is configured to obtain the value of the at least one battery parameter from the battery measurement circuit.

19. The system of claim 15, wherein the at least one battery parameter comprises one of: an open circuit voltage (OCV), a state of charge (SoC), a battery charge throughput, of the battery.

20. The system of claim 15, wherein the at least one charging parameter comprises one or more of: a duty cycle of charging pulses, a frequency of charging pulses, an ON time of charging pulses, an OFF time of charging pulses, and charging current.

* * * * *